3,288,621
MANUFACTURE OF PIGMENT COMPOSITIONS
Gordon Barron, William Black, and Arthur Topham, Manchester, England, assignors to Imperial Chemical Industries Limited, London, England, a corporation of Great Britain
No Drawing. Filed June 11, 1964, Ser. No. 374,294
Claims priority, application Great Britain, Mar. 14, 1962, 9,804/62
14 Claims. (Cl. 106—288)

This is a continuation-in-part of our co-pending application Serial No. 263,690 filed March 8, 1963 now abandoned claiming the priority of British application No. 9,804/62 filed March 14, 1962.

It is an object of the invention to provide pigment compositions having improved resistance to flocculation.

It is a further object of the invention to provide a process for the manufacture of pigment compositions having improved resistance to flocculation.

It is known that certain pigments flocculate in organic media, for example when paints or printing inks containing them are stored, or during slow evaporation of solvent from a thick coating, with resultant loss of tinctorial strength and of homogeneity. This problem is a serious one particularly with phthalocyanine blue pigments and may have the following consequences: It is sometimes impossible to match a painted panel by use of the original paint if a considerable period of storage has taken place after the first painting. It is well known that variations occur in the shades of paints sold under the same trade name and flocculation on storage is a partial reason for this. Moreover, the shade produced by a paint in which the pigment has flocculated, depends upon the method of application. Thus, vigorous brushing or spraying may bring about a partial deflocculation of the pigment particles and the shades produced by this means, though weaker than the original shade of the paint, are nevertheless stronger than those obtained by dipping. It is often necessary to coat parts of an object, for example an automobile, in different ways and this can result in a variety of shades being discernible after assembly. Flocculation in printing inks may also result in increased viscosity.

Many pigments also exhibit crystal growth or polymorphic change in such media as are used for paints and printing inks, and this frequently results in shade change and loss of tinctorial strength. Phthalocyanine pigments, particularly copper phthalocyanine, frequently suffer from all these defects.

Various procedures have been described for improving the resistance of pigments, particularly phthalocyanine pigments, to flocculation and crystal growth. Thus, it has been proposed to coat pigment particles with colourless protective substances. The tinctorial strength of a pigment is reduced by coating in this way. Moreover, we have not found this to be an effective means of improving resistance to flocculation.

We have now found that by treating (for example coating) pigments with certain pigment derivatives containing basic groups, we are able to obtain novel pigment compositions which have improved resistance to flocculation and to crystallisation in non-aqueous media such as paint media, and are also of good shade and strength and have fastness properties not inferior to those of the untreated pigments.

According to the invention we provide a pigment composition consisting essentially of a pigment intimately incorporated with an organic pigment derivative of the formula $$A-[CH_2-X]_m$$

wherein A is the molecule of a pigment selected from the class consisting of copper phthalocyanine, isodibenzanthrone, 4,4'-bis-(6-methylbenzthiazyl)azobenzene and linear quinacridone, X represents a member of the class consisting of secondary and tertiary amine groups and $m$ is an integer from 1 to 5.

According to the invention also we manufacture a pigment composition by intimately incorporating a pigment with a pigment derivative as aforesaid.

Incorporation of the pigment derivative with the pigment may be carried out in various ways, for example:

(1) A pigment and an organic pigment derivative as aforesaid may be milled together in solid form, preferably in presence of a grinding aid such as an inorganic salt, for example sodium chloride, carbonate or sulphate. The inorganic salt may then be removed in known manner, for example by solution in water, and the pigment composition may be dried.

(2) A pigment and an organic pigment derivative as aforesaid may be together dissolved in a solvent such as sulphuric acid and co-precipitated by drowning the solution in a non-solvent such as water. Excellent results are obtained by drowning into water which is violently agitated. After precipitation, the pigment composition may be filtered off, washed and dried.

(3) Non-flocculating pigment compositions may be obtained in situ in simple manner by merely mixing a pigment with an organic pigment derivative as aforesaid which is soluble in the non-aqueous medium in which the pigment is to be employed, e.g. a paint or printing ink medium. On incorporating the mixture into the medium in conventional manner, the organic pigment derivative dissolves and coats the pigment particles.

(4) A pigment may be mixed with an organic pigment derivative in presence of an organic liquid or a dilute aqueous acid. If the derivative is soluble in the organic liquid or dilute acid, coated pigment particles result. When non-acidic organic liquids such as methanol or cyclohexane are used as solvent, the pigment particles adsorb the organic pigment derivative from solution, but when a dilute acid is used as solvent, a raising of the pH may be necessary in order to produce a satisfactory coating on the pigment particles. If the organic pigment derivative is insoluble in the organic liquid or dilute acid, a pigment composition according to the invention may be produced by milling the mixture. Milling of the mixture is always advantageous and is essential if the organic pigment derivative is insoluble in the organic liquid or dilute acid. We find that milling of the mixture, especially vigorous agitation with particulate grinding elements such as sand or glass beads, produces products of higher tinctorial strength than those obtained by other methods, even in cases where the pigment used in the process is sufficiently finely divided to be considered as being of "maximum" tinctorial strength. It is frequently observed that the deflocculation occurs when an organic pigment paste (for example a filter cake) is treated with an organic pigment derivative as aforesaid in presence of a dilute acid, resulting in a marked decrease in viscosity so that the suspension may be milled without further dilution.

Advantageously therefore, a pigment composition according to the invention may be manufactured by milling a pigment with an organic pigment derivative as aforesaid in an organic liquid or preferably in a dilute aqueous acid, and if desired raising the pH of the mixture. This process is particularly adaptable to the manufacture of a pigment composition comprising copper phthalocyanine and a derivative thereof. It is especially advantageous to apply this process to the manufacture of a pigment composition by vigorously agitating with particulate grinding element such as sand or glass beads a crude copper phthalocyanine in a form directly obtained by synthesis and an aforesaid derivative of copper phthalocyanine.

As dilute aqueous acids which may be used in this process we may mention organic carboxylic acids such as formic, acetic, propionic, butyric, tartaric and succinic acids, organic sulphonic acids such as paratoluene sulphonic acid, and inorganic acids such as hydrochloric, sulphuric and phosphoric acid. Acid strengths from 1 to 50%, especially from 1 to 30% may be employed. After milling in presence of a dilute acid it is preferable to raise the pH of the mixture above 7.

The pigment compositions of our invention may contain pigments of the inorganic type, for example titanium dioxide, carbon black, iron oxide, and Prussian blue, or of the organic type, for example azo and anthraquinone vat pigments and phthalocyanine pigments, particularly copper phthalocyanine.

The organic pigment derivatives contained in our pigment compositions may be obtained by reacting halogenomethylated, for example chloromethylated organic pigments with primary or secondary amines. As examples of halogenomethylated pigments we may mention bis-(chloromethyl) isodibenzanthrone, bis and tris-(chloromethyl)-copper phthalocyanine, bis and tris-(chloromethyl)-4:4'-bis-(6-methylbenzthiazyl)azobenzene and chloromethyl-lin-quinacridone. Known chloromethylation procedures usually result in mixtures, for example of bis- and tris-compounds. As examples of primary and secondary amines with which such halogenomethylated pigments may be reacted we may mention methylamine, ethylamine, isopropylamine, octylamine, dodecylamine, cetylamine, benzylamine, dimethylamine diethylamine ethanolamine, diethanolamine, N-β-hydroxyethylbenzylamine, piperidine, pyrrolidine, t-butylamine, cyclohexylamine, ethylene diamine and γ-dimethylaminopropylamine.

The pigment compositions of the invention are of value as colouring matters for paints, lacquers, enamels, printing inks, plastic materials and the like and are characterised by their high degree of resistance to flocculation and to crystal growth in non-aqueous media.

Pigment compositions which are of great value are those containing blue phthalocyanine pigments, especially copper phthalocyanine and its halogeno (particularly monochloro) derivatives, the pigments commonly called benzidine yellows, which are obtained by coupling tetrazotised benzidine and its derivatives (e.g. 3:3'-dichlorobenzidine) with acetoacetanilides, the quinacridone red pigments, and the chrome yellow pigments. These pigments flocculate readily and the pigment compositions which contain them show pronounced advantages over the parent pigment in being more stable in shade and strength in paint and printing ink media and in that printing inks containing them are less viscous.

A preferred pigment composition of the invention comprises a copper phthalocyanine or copper monochlorophthalocyanine intimately incorporated with a copper phthalocyanine derivative of the formula

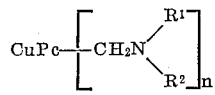

wherein CuPc represents copper phthalocyanine, $R^1$ represents hydrogen or an alkyl or hydroxyalkyl radical, $R^2$ represents an alkyl, cycloalkyl, hydroxyalkyl, aminoalkyl or aralkyl radical, and $n$ is an integer from 1 to 5.

Above all, we find that the pigment compositions of our invention which have the highest resistance to flocculation, crystal growth and polymorphic change are those comprising copper phthalocyanine or copper monochlorophthalocyanine intimately incorporated with a copper phthalocyanine derivative of the formula

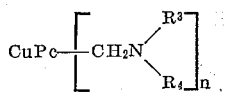

wherein CuPc represents copper phthalocyanine, $R^3$ represents hydrogen or a hydroxyalkyl radical of 2 or 3 carbon atoms, $R^4$ represents an alkyl radical of 1 to 22 carbon atoms and $n$ is an integer from 1 to 5. Such compositions, in addition to possessing the advantages enumerated above, are valuable for the coloration of stoving enamels since, after stoving, they do not bleed into a second coating of pigmented medium.

It is generally desirable that in the pigment compositions of the invention an organic pigment derivative should be incorporated with a pigment of the same colour, and this may often be accomplished by using a derivative of the particular pigment whose properties it is desired to improve, for example by incorporating a copper phthalocyanine derivative with copper phthalocyanine itself. Sometimes, however, it is desirable to alter slightly the shade of a pigment and in this case the organic pigment derivative may be of a different colour from the pigment.

The proportions of pigment and organic pigment derivative in the pigment composition of the invention are not critical. We find that pigment compositions containing from 1 to 20%, and especially from 2% to 10% by weight of the organic pigment derivative have excellent properties.

It is often further advantageous to treat a pigment composition obtained by the process of the invention with a long-chain fatty acid such as a dicarboxylic acid of about 36 carbon atoms. In this way a fatty acid salt of the organic pigment derivative may be formed and the pigment composition thereby rendered more hydrophobic. Such pigment compositions are within the scope of the invention.

If desired the pigment compositions of the invention may be treated by known processes for obtaining soft textured powders. Such processes include, for example, stirring the aqueous suspension with toluene before drying.

We now describe the manufacture of the organic pigment derivatives used in the examples which follow:

(I) *Copper bis- and tris-(dicetylaminomethyl)phthalocyanine.*—A mixture of 2.5 parts of a mixture of copper bis- and tris(chloromethyl)phthalocyanine containing 14.3% of chlorine and 10 parts of dicetylamine is stirred for 16 hours at 100° C. 17 parts of toluene and 15 parts of a 4% sodium hydroxide solution are added and the mixture is stirred for 1 hour on a steam bath, then cooled and diluted with 200 parts of ether. The ether layer is separated and washed with water and the ether is evaporated leaving a dark blue tar which is readily soluble in cyclohexane to give a deep blue solution.

(II) *Copper bis- and tris-(di-β-hydroxyethylaminomethyl)phthalocyanine.*—A mixture of 2.5 parts of a mixture of copper bis- and tris-(chloromethyl)phthalocyanine containing 14.3% of chlorine and 100 parts of diethanolamine is stirred for 16 hours at 100° C. The mixture is cooled and diluted with 800 parts of methanol and the solid is filtered off, washed with methanol, and ether and dried. The product is insoluble in white spirit, but readily soluble in 6% acetic acid to give a deep blue solution.

(III) *Copper pentakis(diethylaminomethyl)phthalocyanine.*—This is obtained from copper pentakis-(chloromethyl)phthalocyanine and diethylamine using conditions similar to those described for derivative VIII.

(IV) *Copper bis- and tris-(N-cetyl-N-β-hydroxyethylaminomethyl)phthalocyanine.*—5 parts of a mixture of bis- and tris-(chloromethyl)phthalocyanine containing 14.3% of chlorine, 15 parts of 2-cetylaminoethanol and 15 parts of toluene are stirred for 16 hours at 100° C. 300 parts of methanol are added, the mixture is boiled and stirred, and the liquid is then decanted from the dark blue sticky solid. The product is again stirred and boiled with 200 parts of methanol, the liquid is decanted and the solid is dried. A dark blue solid is obtained which is readily soluble in white spirit to give a deep blue solution.

(V) *Copper bis- and tris-(N-cetyl-N-β-hydroxypropylaminomethyl)phthalocyanine.*—This is obtained in a similar manner to derivative IV, using 1-cetylaminopropan-2-ol in place of 2-ceytlaminoethanol.

(VI) *Copper bis- and tris-(N-dodecyl-N-β-hydroxyethylaminomethyl)phthalocyanine.*—This is obtained in a similar manner to derivative IV, using 2-dodecylaminoethanol in place of 2-cetylaminoethanol.

(VII) *Copper bis- and tris-(N-ethyl-N-β-hydroxyethylaminomethyl)phthalocyanine.*—5 parts of a mixture of copper bis- tris-(chloromethyl)phthalocyanine containing 41.3% chlorine, 15 parts of 2-ethylaminoethanol and 15 parts of methyl isobutyl ketone are stirred for 16 hours at 100° C. The mixture is diluted with 250 parts of hot water, cooled and the liquid is decanted from the solid. The solid is then stirred with cold water, filtered off, washed with water and dried. The product is insoluble in white spirit but readily soluble in 6% acetic acid to give a deep blue solution.

(VIII) *Copper bis- and tris-(t-butylaminomethyl)phthalocyanine.*—20 parts of a mixture of copper bis- and tris-(chloromethyl)phthalocyanine containing 14.3% chlorine and 80 parts of t-butylamine are stirred and refluxed for 16 hours. The mixture is cooled, diluted with 500 parts of water and the solid is filtered off, well washed with water and dried. The product is only very sparingly soluble in white spirit, but readily soluble in 6% acetic acid to give a deep blue solution.

(IX) *Copper bis- and tris-(isopropylaminomethyl)phthalocyanine.*—This is prepared in a similar manner to derivative VIII using isopropylamine in place of t-butylamine.

(X) *Copper bis- and tris-(isobutylaminomethyl)phthalocyanine.*—This is prepared in a similar manner to derivative VIII using isobutylamine in place of t-butylamine.

(XI) *Copper bis- and tris-(diethylaminomethyl)phthalocyanine.*—This is obtained in similar manner to derivative VIII using diethylamine in place of t-butylamine.

(XII) *Copper tris-(cyclohexylaminomethyl)phthalocyanine.*—This is obtained in similar manner to derivative VIII using cyclohexylamine and copper tris-(chloromethyl)phthalocyanine at 100° C.

(XIII) *Copper bis- and tris-(β-hydroxyethylaminomethyl)phthalocyanine.*—25 parts of a mixture of copper bis- and tris-(chloromethyl)phthalocyanine containing 14.3% chlorine and 100 parts of ethanolamine are stirred for 16 hours at 100° C. The mixture is cooled and diluted with 900 parts of methanol and the solid is filtered off, washed with methanol and dried. The product is insoluble in toluene but readily soluble in 6% acetic acid.

(XIV) *Copper bis- and tris-(β-hydroxypropylaminomethyl)phthalocyanine.*—This is obtained in similar manner to derivative XIII using β-hydroxypropylamine in place of ethanolamine.

(XV) *Copper bis- and tris-(β-amionethylaminomethyl)phthalocyanine.*—This is obtained in similar manner to derivative XIII using ethylene diamine in place of ethanolamine.

(XVI) *Copper pentakis(isopropylaminomethyl)phthalocyanine.*—This is obtained from copper pentakis(chloromethyl)phthalocyanine and isopropylamine using conditions similar to those described for derivative VIII.

(XVII) *Bis- and tris-(isopropylaminomethyl)-4:4'-bis-(6-methylbenzthiazyl)azobenzene.*—A mixture of 200 parts of a mixture of bis- and tris-(chloromethyl)-4:4'-bis-(6-methylbenzthiazyl)azobenzene (containing 13.8% chlorine) and 555 parts of isopropylamine is stirred and refluxed for 16 hours. After adding 1000 parts of water, the yellow solid is filtered off, washed with water and dried. The product is readily soluble in 9% lactic acid.

(XVIII) *Mono- and bis-(isopropylaminomethyl)isodibenzanthrone.*—A mixture of 25 parts of a mixture of mono- and bis-(chloromethyl)-isodibenzanthrone (containing 11.5% chlorine) and 70 parts of isopropylamine is stirred and refluxed for 16 hours. After cooling and adding 300 parts of water, the violet solid is filtered off, washed with water and dried. It is soluble in dilute lactic acid solution.

(XIX) *Isopropylaminomethyl derivative of linear quinacridone.*—12.5 parts of linear quinacridone is added to a stirred mixture of 92 parts of concentrated sulphuric acid and 18.5 parts of bis-(chloromethyl)-ether. After stirring at 50° for 16 hours the mixture is added to ice. The solid is filtered off, washed free from acid, washed with acetone and dried. The chloromethyl derivative so obtained contains 17.1% Cl.

A mixture of 70 parts of isopropylamine and 10 parts of the chloromethylated quinacridone is stirred and refluxed for 16 hours. After cooling and adding 300 parts of water, the solid is filtered off, washed with water and dried. It is readily soluble in N acetic acid.

(XX) *Copper bis- and tris-(N-methyl-N-benzylaminomethyl)phthalocyanine.*—This is obtained from copper bis- and tris-(chloromethyl)phthalocyanine and N-methylbenzylamine using conditions similar to those described for derivative VIII.

(XXI) *Copper bis- and tris - (cetylaminomethyl)phthalocyanine.*—A mixture of 20 parts of a mixture of copper bis- and tris-(chloromethyl)phthalocyanine (containing 14.3% chlorine) and 100 parts of cetylamine is stirred for 16 hours at 150°. The excess cetylamine is removed by washing with hot ethanol. The blue solid is slurried with water and basified with sodium carbonate. After filtering, it is washed with hot ethanol and dried.

(XXII) *Copper tris-(methylaminomethyl)phthalocyanine.*—A mixture of 20 parts of copper tris-(chloromethyl)phthalocyanine and 100 parts of a 41% aqueous solution of methylamine is stirred 16 hours at 20°. The solid is filtered off, washed with methanol and dried.

(XXIII) *Copper tris - (β - aminoethylaminomethyl) phthalocyanine.*—1 part of copper trischloromethylphthalocyanine is heated at 100° C. with 3 parts of ethylene diamine for 16 hours. The mixture is diluted with water and the product is filtered off, washed and dried.

(XXIV) *Copper tris - (γ-dimethylaminopropylaminomethyl)phthalocyanine* is made in a similar manner to XXIII using γ-dimethylaminopropylamine in place of ethylene diamine.

XXV. *Copper tris-(N-benzyl-N-β-hydroxyethylaminomethyl)phthalocyanine* is made in a similar manner to XXIII using N-benzyl-N-β-hydroxyethylamine in place of ethylene diamine.

XXVI. *Copper tris - (hexamethyleneiminomethyl)-phthalocyanine* is made in a similar manner to XXIII using hexamethylene imine in place of ethylene diamine.

The invention is illustrated but not limited by the following examples in which the parts are by weight. When incorporated in alkyd resin paints the final product of each example has excellent resistance to flocculation and crystallisation. The Abbreviation "C.I." refers to "Colour Index" (Second Edition).

*Example 1*

A laboratory ball mill comprising a horizontal rotating cylinder containing 3,500 parts of stainless steel balls is charged with 300 parts of dry sodium carbonate, 50 parts of a copper chlorophthalocyanine containing about 4% of chlorine and 5 parts of organic pigment derivative XI. The cylinder is rotated at 70 revolutions per minute for 30 hours and the sodium carbonate is removed from the mixture by extraction with water. The resulting pigment is treated with 5% sulphuric acid to remove traces of iron from the billing and the slurry is filtered and washed and the product is dried at 70° C.

*Example 2*

50 parts of a copper chlorophthalocyanine containing about 4% of chlorine and 5 parts of organic pigment derivative IX are added slowly to 440 parts of concentrated sulphuric acid and stirred until completely dissolved. The resulting solution is then drowned into water under conditions of high turbulence. The precipitated pigment composition is filtered off, and after washing is reslurried in 400 parts of water and sufficient ammonia liquor to give a pH of 9. The slurry is heated and stirred at 90° C. for 18 hours, then filtered, washed and dried.

*Example 3*

50 parts of a copper chlorophthalocyanine containing about 4% of chlorine, 5 parts of organic pigment derivative XVI and 320 parts of methanol are charged into a laboratory mill comprising a stainless steel beaker which is fitted with a stirrer and contains 1200 parts of sand (of particle size 0.25 to 0.3 millimetres). The stirrer is driven at about 1100 revolutions per minute for 1 hour. The pigment suspension is then separated from the sand by sieving through a cloth and the methanol is removed and recovered by steam distillation. The resulting aqueous slurry is then filtered and the filter cake is dried at 80° C.

*Example 4*

10 parts of a copper chlorophthalocyanine containing about 4% of chlorine is stirred with 2.8 parts of methanol to wet it thoroughly, then a solution of 1 part of organic pigment derivative VIII in 20 parts of 6% acetic acid and 100 parts of water is added. The mixture is stirred and 4% sodium hydroxide solution is gradually added until the mixture is alkaline. The solid is then filtered off, washed with water and dried.

In the same manner organic pigment derivatives, II, III, VII, X, XIII, XIV, XV anl XXII may be coated on to the copper chlorophthalocyanine or on to copper phthalocyanine.

Organic pigment derivative XII may be coated on to the copper chlorophthalocyanine or copper phthalocyanine in similar manner, using 9% lactic acid in place of 6% acetic acid.

*Example 5*

28 parts of a copper chlorophthalocyanine containing about 4% of chlorine is stirred with 28 parts of cyclohexane to wet it thoroughly, then 11.9 parts of a 4.2% solution of organic pigment derivative V in cyclohexane is added. The mixture is stirred for a few minutes, during which time all the soluble blue pigment derivative is adsorbed onto the surface of the pigment. The coated pigment is isolated by allowing the cyclohexane to evaporate.

Copper phthalocyanine powder may be coated in a similar manner.

*Example 6*

100 parts of a copper chlorophthalocyanine containing about 4% of chlorine is stirred and refluxed for 1 hour with a solution of 10 parts of organic pigment derivative IV in 250 parts of cyclohexane. After cooling to 20° and stirring for 16 hours the coated pigment is filtered off and dried. The filtrate is colourless, showing that the derivative has been well adsorbed onto the surface of the pigment.

*Example 7*

An aqueous paste of 30 parts of finely divided copper phthalocyanine, 70 parts of a copper chlorophthalocyanine containing about 5.8% of chlorine and 200 parts of a 5% solution of organic pigment derivative IX in N acetic acid is milled together for 2½ hours in the apparatus described in Example 3. The suspension then contains particles of 1 micron and less diameter with a few particles of up to 2 microns in diameter. The pigment suspension, separated from the sand, is useful for paper and paper laminate coloration.

Alternatively, after separation from the sand 2N sodium hydroxide solution is added during 30 minutes with stirring until the mixture is alkaline. The solid is then filtered, and the filter cake is washed free of electrolyte and dried. The resultant powder when ball milled in alkyd and stoving paint media gives paints of high resistance to flocculation. The paints have low viscosity and are extremely bright in shade and tinctorially strong.

*Example 8*

The wet filter-cake obtained as described in Example 7 is suspended in 1500 parts of water and a solution of 10 parts of a dimerised fatty acid in 22 parts of toluene is added. (The dimerised fatty acid is essentially a mixture of dibasic acids resulting from the polymerisation of naturally occurring unsaturated acids. It has an equivalent weight of 292 to 298). The suspension is passed through a homogeniser mill and the milled suspension is filtered and the filter cake dried at 100° C. The product is a soft textured powder which mills easily into alkyd and stoving paints to give paints of high resistance to flocculation.

*Example 9*

The wet filter cake obtained as described in Example 7 is suspended in 1000 parts of water and there is added dropwise, with stirring, a solution of 10 parts of the same dimerised fatty acid as used in Example 8 in 5% aqueous triethanolamine. After the addition is complete 400 parts of an acetate buffer is added slowly to lower the pH to approximately 5. The suspension is filtered and the filter cake is washed free of electrolyte and dried at 100° C. The product is a soft textured blue powder which mills easily into alkyd and stoving paint media to give bright, tinctorially strong paints of high resistance to flocculation.

*Example 10*

A mixture of 1 part of organic pigment derivative I and 10 parts of a copper chlorophthalocyanine containing about 4% of chlorine is milled into a white spirit solution of a long-oil air-drying alkyd resin and the product is mixed with a milled suspension of titanium dioxide in the same medium. The blue paint obtained has high resistance to flocculation.

In place of organic pigment derivative I in this example, organic pigment derivative V, VI, III, XX or XXI may be used.

*Example 11*

A mixture of 50 parts of an aqueous paste containing 28% of a copper chlorophthalocyanine containing 4% of chlorine, and 55 parts of a 1.3% solution of organic pigment derivative XVIII in 2% lactic acid in milled together for 4 hours in the apparatus described in Example 3. The suspension is separated from the sand and rinsed off the sand with two portions of 50 parts of 2% lactic acid. The suspension is stirred whilst 8% sodium hydroxide is gradually added until the mixture is alkaline. The solid is then filtered off, and the filter cake is washed free of electrolyte and dried. The resultant powder when ball milled in a stoving paint medium and mixed with stoving medium pigmented with titanium dioxide, gives a paint of high resistance to flocculation.

*Example 12*

A mixture of 165 parts of 24.2% Monolite Yellow GL paste (C.I. 21100) and 40 parts of a 5% solution of organic pigment derivative XVII in 9% lactic acid is stirred for 1 hour, then 8% sodium hydroxide is gradually added until the mixture is alkaline. The solid is filtered off, and the filter cake is washed free of electrolyte and dried. The resultant powder when ball milled in an alkyd paint medium gives a paint which is tinctorially stronger than that made from the untreated pigment. When milled into a lithographic varnish to give a printing ink containing 20% of pigment, the resulting ink has a viscosity of only 211.4 poises at 25° C. and a rate of shear of 136 sec.$^{-1}$, compared with a viscosity of 277 poises for a printing ink made from the untreated pigment and measured under the same conditions, using a Ferranti-Shirley cone and plate viscometer.

In this example, Monolite Fast Yellow GN (C.I. 11680) or Monolite Fast Yellow 10G (C.I. 11680) can be used in place of the Monolite Yellow GL.

*Example 13*

A mixture of an aqueous paste containing 100 parts of the α-form of copper phthalocyanine, and 100 parts of a 5% solution of organic pigment derivative XII in 9% lactic acid is stirred whilst dilute sodium hydroxide solution is gradually added until the mixture is alkaline. The solid is filtered off, washed with water and dried. This treated pigment when ball milled in an alkyd paint medium and mixed with alkyd pigmented with titanium dioxide gives a paint of high resistance to flocculation and tinctorially much stronger than a paint made similarly from the untreated pigment. The improved resistance to polymorphic change shown by the pigment composition of this example is shown by the following test:

A mixture of the pigment composition and titanium dioxide is milled into a alkyd paint medium and diluted with xylene to produce a mixture containing 36% of xylene. The resultant paint is stored for 2 days at 40° and the shade is compared with the freshly prepared paint. There is no shade change with the pigment composition of this example whereas the untreated blue pigment becomes weaker and greener due to production of the β-form of copper phthalocyanine.

*Example 14*

5 parts of an aqueous filter cake containing 30.75% of the α-form of copper phthalocyanine is well mixed with 1.5 parts of a 5% solution of organic pigment derivative IX in 2% acetic acid, to give a well deflocculated pourable fluid aqueous suspension of the pigment. When 5 parts of the same filter cake are mixed with 1.5 parts of water, a stiff paste is obtained.

*Example 15*

5 parts of an aqueous filter cake containing 24.2% of Monolite Fast Yellow GL is well mixed with 1.5 parts of a 5% solution of organic pigment derivative XVII in 9% lactic acid, to give a well deflocculated pourable fluid aqueous suspension of the pigment. When 5 parts of the same filter cake is mixed with 1.5 parts of water, a stiff paste is obtained.

*Example 16*

220 parts of an aqueous filter cake containing 100 parts of the α-form of copper phthalocyanine is mixed with 100 parts of a 5% solution of organic pigment derivative XII in 3% lactic acid and 180 parts of 3% lactic acid and milled for 6 hours in the apparatus described in Example 3. The suspension is separated from the sand and 8% sodium hydroxide is added during 30 minutes with stirring until the mixture is alkaline. The solid is then filtered off, washed free from electrolyte and dried. The resultant powder when heated with an equal weight of stearic acid at 150° C. for 2 hours shows no detectable change to the β-form (by X-ray powder photography). The untreated α-form of copper phthalocyanine undergoes complete conversion to the β-form when heated with stearic acid under the same conditions.

*Example 17*

An aqueous paste containing 100 parts of the β-form of copper phthalocyanine is stirred with 100 parts of a 5% solution of organic pigment derivative IX in 2% acetic acid. Dilute sodium hydroxide solution is slowly added until alkaline. The solid is filtered off, washed with water and dried.

This product is valuable for use in gravure printing inks, inks containing it being less viscous and superior in brightness, strength and finish compared with corresponding inks containing the untreated pigment.

*Example 18*

10 parts of Pure Middle Chrome GNS powder (C.I. 77600) is stirred with 24 parts of methanol. 10 parts of a 5% solution of organic pigment derivative XVII in 9% lactic acid, and 50 parts of water are added. The mixture is stirred whilst 1.3% sodium hydroxide solution is gradually added until alkaline. The solid is filtered off, washed and dried.

When this treated pigment is milled into a white spirit solution of a long-oil alkyd resin and mixed with a white spirit solution of the alkyd pigmented with titanium dioxide, the resulting yellow paint is tinctorially much stronger than a paint made similarly from untreated pigment.

*Example 19*

20 parts of a pigment obtained by coupling diazotised 3,3′-dichlorobenzidine with acetoacet-o-anisidide is stirred with 60 parts of methanol. 20 parts of a 5% solution of organic pigment derivative XVII in 9% lactic acid, and 100 parts of water are added. The mixture is stirred whilst 1.3% sodium hydroxide solution is gradually added until alkaline. The solid is filtered off, washed and dried.

1.25 parts of this treated pigment is ball milled with 3.3 parts of a white spirit solution of a long oil alkyl resin and 5.5 parts of white spirit. The suspension obtained shows a seed level of up to 10μ, compared with 20μ for a suspension made in the same manner from the untreated pigment. The viscosities of these two suspensions, measured with a Ferranti-Shirley cone and plate viscometer at 25° C. are shown in the table:

| Rate of Shear (sec. $^{-1}$) | Viscosity (poises) | |
|---|---|---|
| | Treated pigment | Untreated pigment |
| 17.6 | 10.3 | 67.6 |
| 35.2 | 6.8 | 36.0 |
| 88.0 | 4.7 | 14.9 |
| 176.0 | 3.5 | 8.0 |
| 352.0 | 2.6 | 4.7 |
| 880.0 | 1.8 | 2.5 |

Yellow paints may be produced by diluting 1 part of suspension with 20 parts of a white spirit solution of the alkyd resin pigmented with titanium dioxide. The paint thus obtained from the treated pigment is very much stronger than the paint from the untreated pigment.

*Example 20*

10 parts of powdered flavanthrone (C.I. 70600) is pasted with 16 parts of methanol, then 10 parts of a 5% solution of organic pigment derivative XVII in 9% lactic acid is added, followed by 50 parts of water. The suspension is stirred whilst 1.3% sodium hydroxide is gradually added until alkaline. The solid is filtered off, washed free from electrolyte and dried. When this treated pigment is milled into thin lithographic varnish to give a printing ink containing 10.75% of pigment, the resulting ink is less viscous than a printing ink made from the untreated pigment, as shown in the following table, based on measurements at 25° C. using a Ferranti-Shirley cone and plate viscometer:

| Rate of Shear (sec.$^{-1}$) | Viscosity (poises) | |
|---|---|---|
| | Treated pigment | Untreated pigment |
| 22.7 | 36.2 | 60.5 |
| 45.5 | 30.2 | 54.4 |
| 114.0 | 29.0 | 53.3 |
| 227.0 | 30.2 | 55.5 |
| 455.0 | 29.0 | 50.6 |
| 1140.0 | 27.1 | 45.0 |

Example 21

A mixture of 14.3 parts of a 35% paste of linear quinacridone in γ-crystal phase, 5 parts of a 5% solution of organic pigment derivative XIX in 6% acetic acid, and 50 parts of water is stirred whilst 1.3% sodium hydroxide solution is gradually added until alkaline. The solid is filtered off, washed and dried. The resulting treated pigment is milled into a white spirit solution of a long-oil alkyd resin and diluted with a white spirit solution of the alkyd resin pigmented with titanium dioxide to give a red paint which is tinctorially much stronger than a paint made under the same conditions from untreated pigment.

Example 22

100 parts of crude β-form copper phthalocyanine (i.e. copper phthalocyanine as obtained by reaction of phthalic anhydride, urea and a copper salt in an organic solvent), 170 parts of water, 16 parts of glacial acetic acid and 100 parts of a 5% solution of Pigment Derivative IX in 2% acetic acid are milled with sand for 5 hours. The fine suspension is separated from the sand and made alkaline by gradual addition of 8% sodium hydroxide solution. The pigment composition is then filtered off, washed and dried. It is superior to known β-form copper phthalocyanine pigments in being more resistant to flocculation and crystal growth in paint media and is fully equal to them in shade and tinctorial properties in paints and printing inks.

Example 23

30 parts of crude β-form copper phthalocyanine, 1.5 parts of Organic Pigment Derivative XVI, 1.5 parts of 80% phosphoric acid, 87 parts of water and 360 parts of glass beads of 0.5 millimetre diameter are stirred for 3 hours in a stainless steel beaker fitted with a stirrer comprising a vertical shaft fitted with horizontal disc impellers, by driving the stirrer at a peripheral speed of 1120 feet per minute. The mixture is then diluted with 100 parts of water, separated from the beads and made alkaline by adding 8% sodium hydroxide solution. The pigment composition is filtered off, washed and dried. In paints and lithographic varnish it has excellent tinctorial strength and is highly resistant against flocculation.

In place of Organic Pigment Derivative XVI in this example there may be used any of Organic Pigment Derivatives I to XXVI, especially Nos. XII, XVI, XXIII, XXIV, XXV and XXVI. The strength of the dilute aqueous phosphoric acid used is 1.4%, but much higher strengths may be used if desired. The following acids may be used in place of phosphoric acid:

|  | Percent |
|---|---|
| Acetic acid | 1–50 especially 1–35 |
| Propionic acid | 1–50 especially 1–35 |
| Butyric acid | 1–50 especially 1–35 |
| Lactic acid | 1–30 |
| Tartaric acid | 1–30 |
| p-Toluene sulphonic acid | 1–30 |
| Hydrochloric acid | 1–10 |
| Sulphuric acid | 1–10 |

By the technique described in this example pigment compositions of high tinctorial strength and excellent resistance against flocculation may be obtained from other pigments and Organic Pigment Derivatives. The following combinations have been found to be valuable, but the list is not intended to be in any way exhaustive.

| Pigment: | Organic Pigment Derivative |
|---|---|
| Copper tetrachloro phthalocyanine | XVI, XVII |
| Monolite Yellow GTNS (C.I. 21090) | XVII |
| Monolite Yellow GTNS (C.I. 21090) | XVII |
| lin-quinacridone (γ-form) | XIX |
| lin-quinacridone (α-form) | XIX |

We claim:

1. A pigment composition consisting essentially of a pigment intimately incorporated with an organic pigment derivative, the pigment being selected from the class consisting of blue copper phthalocyanine pigments, benzidine yellow pigments, quinacridone red pigments and chrome yellow pigments and the organic pigment derivative being of the formula $$A—[CH_2—X]_m$$

wherein A is the molecule of a pigment selected from the class consisting of copper phthalocyanine, isodibenzanthrone, 4,4′-bis(6-methylbenzthiazyl)azobenzene and linear quinacridone, X is a residue of a primary or secondary amine, the N atom thereof being bonded to the $CH_2$ and m is an integer from 1 to 5, and the proportion of organic pigment derivative in the composition being from 1% to 20% by weight.

2. A pigment composition according to claim 1 wherein a proportion by weight of organic pigment derivative is from 2% to 10%.

3. A pigment composition according to claim 1 wherein the particles of pigment are coated with the organic pigment derivative.

4. A pigment composition consisting essentially of copper phthalocyanine intimately incorporated with a copper phthalocyanine derivative of the formula $$CuPc—[CH_2NHR]_m$$

wherein CuPc represents the molecule of copper phthalocyanine, R is an alkyl radical of 1–22 carbon atoms and m is an integer from 1 to 5 and wherein said copper phthalocyanine derivative is present in amounts of 1% to 20% by weight of said composition.

5. A pigment composition consisting essentially of copper phthalocyanine and copper monochloro phthalocyanine intimately incorporated with a copper phthalocyanine derivative of the formula $$CuPc—[CH_2NHR]_m$$

wherein CuPc represents the molecule of copper phthalocyanine, R is an alkyl radical of 1–22 carbon atoms and m is an integer from 1 to 5 and wherein said copper phthalocyanine derivative is present in amounts of 1% to 20% by weight of said composition.

6. Copper phthalocyanine intimately incorporated with copper bis and tris(isopropylaminomethyl)phthalocyanine present in amounts of 1% to 20% by weight of said mixture.

7. Copper phthalocyanine and copper monochlorophthalocyanine intimately incorporated with copper bis and tris(isopropylaminomethyl)phthalocyanine present in amounts of 1% to 20% by weight of said mixture.

8. Process for manufacture of a pigment composition, said composition defined as in claim 1 which process comprises milling together a pigment and an organic pigment derivative as defined in claim 1 in presence of a grinding aid.

9. Process for manufacture of a pigment composition, said composition defined in claim 1 which process comprises dissolving a pigment and an organic pigment derivative as defined in claim 1 in sulphuric acid and drowning the solution in water.

10. Process for manufacture of a pigment composition, said composition defined as in claim 1 which process comprises coating the particles of the pigment by treatment with a solution of an organic pigment derivative as defined in claim 1.

11. Process for manufacture of a pigment composition, said composition defined as in claim 1 which process comprises vigorously agitating pigment and organic pigment derivative in a dilute acid with particulate grinding elements and subsequently raising the pH of the mixture above 7.

12. Process for manufacture of a pigment composition wherein a blue copper phthalocyanine pigment is intimately incorporated with an organic pigment derivative of the formula $$CuPc-[CH_2-M]_m$$

wherein CuPc represents copper phthalocyanine, X is a residue of a primary or secondary amine, the N atom thereof being bonded to the CH$_2$ and $m$ is an integer from 1 to 5 and the proportion of organic pigment derivative in the composition is from 1% to 20% by weight said process comprising vigorously agitating a crude copper phthalocyanine in a form obtained by synthesis and an organic pigment derivative as aforesaid with a dilute aqueous acid and particulate grinding elements and subsequently raising the pH of the mixture above 7.

13. Process for manufacture of a dispersion of a pigment composition in a medium selected from the class consisting of paint and printing ink media which comprises incorporating into said medium a pigment and an organic pigment derivative as defined in claim 1.

14. A coating composition containing a pigment composition according to claim 1 and a vehicle therefor.

References Cited by the Examiner

UNITED STATES PATENTS

| | | | |
|---|---|---|---|
| 2,846,441 | 8/1958 | Muehlbauer et al. | 106—288 |
| 2,855,403 | 10/1958 | McKellin et al. | 106—288 |
| 3,065,092 | 11/1962 | Geiger et al. | 106—288 |
| 3,081,189 | 3/1963 | Zwahlen | 106—288 |
| 3,105,768 | 10/1963 | Zwahlen | 106—288 |
| 3,156,575 | 11/1964 | Gagliano | 106—288 |
| 3,160,635 | 12/1964 | Knudsen et al. | 106—288 |

TOBIAS E. LEVOW, *Primary Examiner.*

S. E. MOTT, *Assistant Examiner.*